United States Patent [19]
Hermann et al.

[11] Patent Number: 5,820,322
[45] Date of Patent: Oct. 13, 1998

[54] FASTENING ELEMENT FOR A SHAPED RAIL

[75] Inventors: Fritz Hermann, Landsberg/Lech; Andreas Sedlmeier, Ummendorf; Armin Hoffmann, Landsberg/Lech; Helmut Mirsberger, Munich; Jakob Dischinger, Eismerszell, all of Germany

[73] Assignee: Hilti Aktiengesellschaft, Schaan, Liechtenstein

[21] Appl. No.: 922,939

[22] Filed: Sep. 3, 1997

[30] Foreign Application Priority Data

Sep. 3, 1996 [DE] Germany ............... 196 35 632.6

[51] Int. Cl.$^6$ ........................................... F16B 39/00
[52] U.S. Cl. ......................... 411/85; 411/84; 411/174; 411/175
[58] Field of Search ............... 411/85, 84, 174, 411/175; 403/403; 24/265 CD, 67.9

[56] References Cited

U.S. PATENT DOCUMENTS

| | | | |
|---|---|---|---|
| 4,575,295 | 3/1986 | Rebentisch | 411/85 |
| 4,676,706 | 6/1987 | Inaba | 411/175 |
| 4,897,005 | 1/1990 | Peterson | 411/175 |
| 5,423,646 | 6/1995 | Gagnon | 411/174 |

FOREIGN PATENT DOCUMENTS

| | | | |
|---|---|---|---|
| 2468784 | 5/1981 | France | 411/85 |
| 2548293 | 1/1985 | France | |
| 8003184 | 1/1982 | Netherlands | |

*Primary Examiner*—Victor N. Sakran
*Attorney, Agent, or Firm*—Anderson, Kill & Olick, P.C.

[57] ABSTRACT

A fastening element for a C-shaped rail (30) including a rail nut (2) insertable through the rail opening (35) into the interior of the rail (30) when longitudinal sides (6, 7) of the rail nut (2) extend parallel to the longitudinal direction of the rail (30), and pivotable in the interior of the rail (3) so that a longitudinal extent (1) of the rail nut (2), which is larger than the width (w) of the slot-like opening (35), would overlap the opening (35); and a rail clip (3) overlapping the rail nut (2) at least in some areas and spaced from the rail nut by an axial distance (d), which is reduced upon clamping the free ends (33, 34) of the shoulders (31, 32) the rail clip (3) being formed as one-piece with the rail nut and being connected with the rail nut (2) by a connection link attached to an edge of the rail nut (2) so that with the longitudinal sides (6, 7) of the rail nut (2) extending parallel to the longitudinal extent of the opening (35), it would engage the free end (33) of one should (31) and, with the longitudinal sides (6, 7) of the rail nut (2) being pivoted with respect to the longitudinal extent of the opening (35), it would engage the free end (34) of the opposite shoulder.

10 Claims, 4 Drawing Sheets

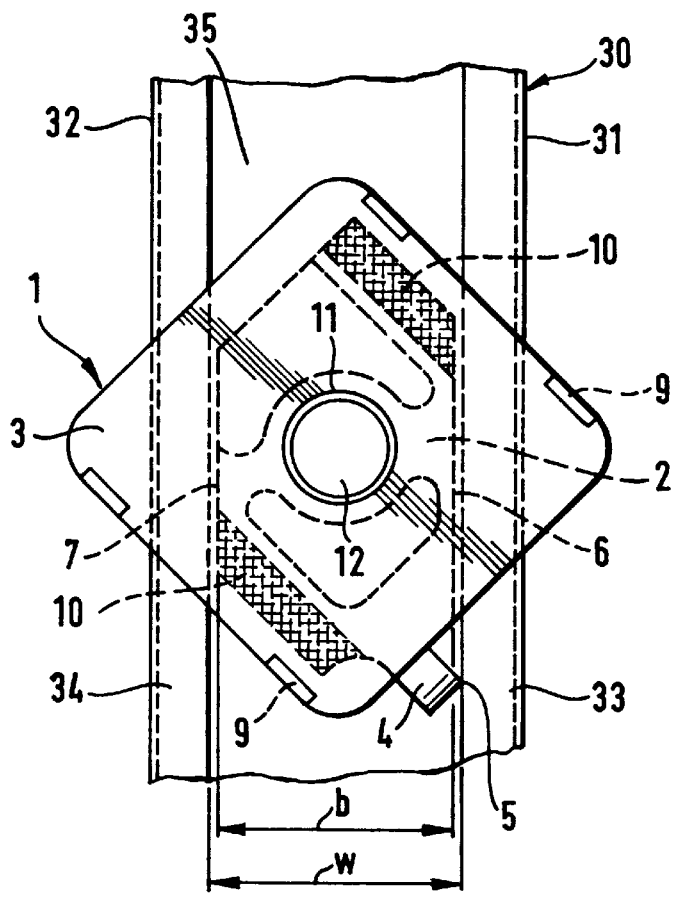
_Fig. 4_
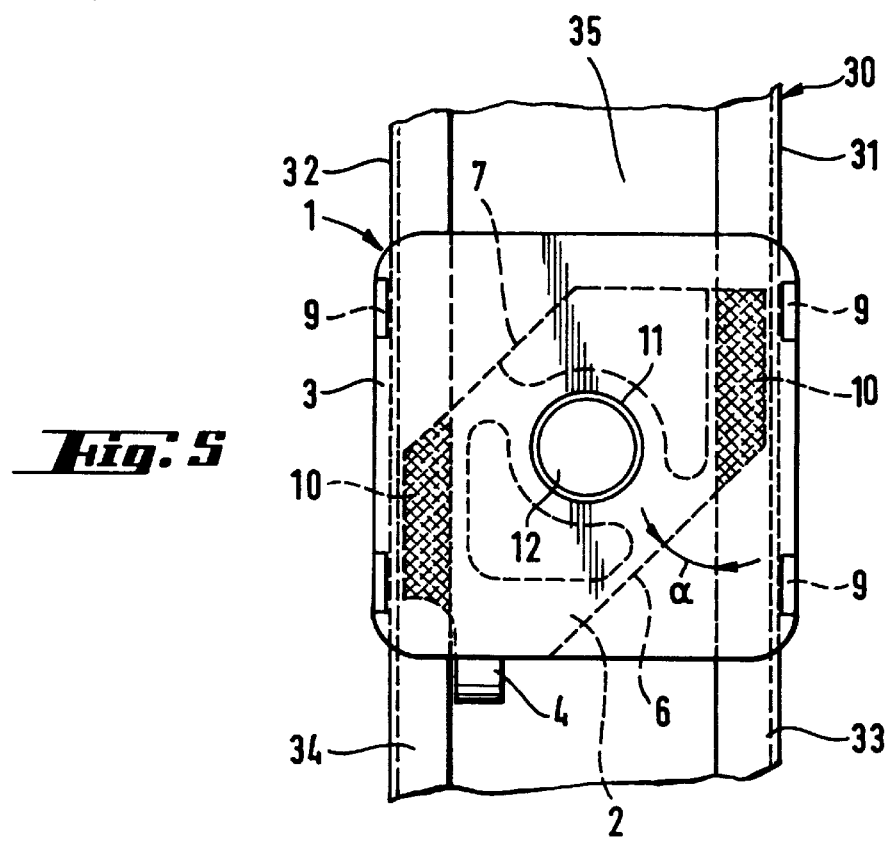
_Fig. 5_

FASTENING ELEMENT FOR A SHAPED RAIL

BACKGROUND OF THE INVENTION

1. Field of the Invention

The present invention relates to a fastening element for a shaped rail having a substantially C-shaped cross-section and a slot-shaped opening extending in a longitudinal direction of the rail and having a width which equals a distance between facing each other free ends of spaced, extending parallel to each, rail shoulders, with the fastening element comprising a rail nut insertable through the rail opening into an interior of the rail when longitudinal sides of the rail nut extend parallel to the longitudinal direction of the rail and pivotable in the interior of the rail so that a longitudinal extent of the rail nut which is larger than the width of the slot-shaped opening, would overlap the opening, and a rail clip overlapping the rail nut at least in some areas and spaced from the rail nut by a certain distance which is reduced upon champing the free ends of the rail shoulders.

2. Description of the Prior Art

Numerous rail system are used in the household technology for installation, e.g., of electric, heating, conditioning, ventilation, and sanitation household devices and accessories. The rail systems include shaped rails having substantially a C-shaped cross-section. A C-shaped rail has a slot-shaped opening which extends in the longitudinal direction of the rail and has a width limited by two, extending parallel to each other, rail shoulders the free ends of which extending parallel to each other, face each other. In order to attach structural components to the rails, there are provided fastening elements which are inserted in the interior of the rails and are secured to the free ends of the shoulders which border the opening. A widely used fastening element is formed as so-called hammer-head bolt which includes a somewhat parallelogram-shaped rail nut connected with a threaded rod. The height of the parallelogram-shaped rail nut is so dimensioned that it, with its longitudinal sides extending parallel to the longitudinal extent of the slot-shaped opening, is insertable from outside into the rail interior. Upon the rail nut being pivoted, the longitudinal extension of the rail nut, which is defined by a distance between the two short sides of the rail nut, spans the width of the slot-shaped opening and prevents the rail nut from falling out from the rail interior. For securing the fastening element in the rail, there are provided a washer and a nut. By screwing the nut on the threaded rod, the free ends of the shoulders, which extend in the longitudinal direction of the rail, are clamped between the rail nut and the washer, whereby the fastening element is secured.

An essential drawback of the known fastening element consists in that it is formed of several parts. The knows fastening element always includes at least a rail nut with an attached threaded rod, a washer and a nut which is screwed on the threaded rod. For securing the fasten element, the threaded bolt need be rotated to bring the rail nut in a proper position with respect to the rail opening so it would not fall out. Then, the washer need be pushed onto the threaded rod, and the nut need be screwed on. At that, care should be taken that the rail nut would not rotate in order to prevent its falling out from the rail. The handling of this known hammer-head bolt requires therefor the use of two hands which, e.g., when standing on a ladder, is not without problem. For mounting and dismounting of a structural component the position of the rail nut of the fastening element should be brought in an exact correspondence with the extent of the slot-shape opening. At that, care should be taken not to overpivot the rail nut in order to be able to withdraw the rail nut from the opening to take it out of the rail interior. The handling of the known fastening element is inconvenient and takes a lot of time. Moreover, the fastening element cannot be brought in its exact securable position with respect to the rail before actually securing it. This results in a danger that without the securing nut being tightened, it can still fall out of the rail opening. Because the fastening element cannot be brought into its exact securable position with respect to the rail, precise positioning of the fastening element along the rail is more difficult.

Accordingly, an object of the present invention is to provide a fastening element for a C-shaped rail which can be attached to and detached from the rail in simple manner, rapidly, and using only one hand. Awkward insertion and withdrawal steps should be prevented. Another object of the present invention is to provide a fastening element which can be brought and retained in its securable position with respect to the rail, without actually being secured to the rail. An unintended falling out of the fastening element should be prevented. In its securable, but not yet secured, position, a precise positioning of the fastening element along the rail should be possible. The fastening element should be simple and economical in manufacturing and be capable of being produced in serial production with standard tools.

SUMMARY OF THE INVENTION

These and other objects of the present invention, which will become apparent hereinafter, are achieved by providing a fastening element for C-shaped rail having a slot-shaped opening extending in a longitudinal direction of the rail and having a width which equals the distance between facing each other free ends of spaced, extending parallel to each other, rail shoulders, which fastening element includes a rail nut insertable through the rail opening into an interior of the rail when longitudinal sides of the rail nut extend parallel to the longitudinal direction of the rail. The rail nut is pivotable in the interior of the rail so that a longitudinal extent of the rail nut which is larger than the width of the slot-shaped opening, would span the opening. A rail clip overlaps the rail nut at least in some areas and is spaced from the rail nut in an axial direction by a distance which at least in an edge section which is brought in an operational connection with the free end of a shoulder, is smaller than a thickness of the free ends of the shoulders. The distance is reduced upon clamping the free ends of the shoulders. The rail clip is formed as one-piece with the rail nut and is connected with the rail nut by a resilient connection link. The connection link is so attached to an edge of the rail nut that with the longitudinal sides of the rail nut extending parallel to the longitudinal extent of the opening, it would engage the free end of one shoulder and, with the longitudinal sides of the rail nut being pivoted with respect to the longitudinal extent of the opening, it would engage the free and of the opposite shoulder.

Forming the fastening element as one piece substantially facilitates its handling. The fastening element according to the present invention can be secured and released with one hand. The width of the rail nut is match to the width of the slot-shaped opening of the rail. The shape of the rail nut is so selected that it, with the rail nut longitudinal sides extending parallel to the longitudinal extent of the slot-shaped opening, can be easily inserted through the opening into the interior of the rail. The length of the rail nut is bigger than the width of the rail opening and is so selected that the rail nut, upon being rotated, is turned inside the rail by a certain angle. The longitudinal extent of the pivoted rail nut spans the opening, preventing the fastening element from falling out of the rail opening. A rail clip, which is formed as one piece with the rail nut, overlaps it and is connected with the rail nut by a resilient connection link. The rail clip is spaced for the rail nut a distance which, at least in the edge region of the fastening element, is smaller than the thickness of the free ends of the rail shoulder. Upon rotation of the fastening element after the rail nut is inserted though the opening, this narrow region engages the free end of one of the shoulders. Thereby, positioning of the fastening element in its securable, with respect to the rail, position becomes possible, The positioning of the fastening elements in its securable position prevents self-displacement of the fastening element and enables precise positioning of the fastening element. The distance between the rail nut and the rail clip upon clamping of the free ends of the rail shoulders is further reduced, whereby the fastening element is secured in its end position.

The connection link is so arranged that it twice serves as a stop. In particular, its arrangement with respect to the rail nut is so selected that it, with the longitudinal sides of the rail nut extending parallel to the longitudinal extent of the opening, during the insertion of the rail nut through the opening, engages the free end one of the rail shoulder. Thus, the connection link functions as aligning and insertion assistance means. Then, the fastening element is rotated about a certain angle into its securable position, in which the connection link engages the opposite rail shoulder. The connection link prevents overpivoting of the fastening element or of the rail nut which is located in the rail interior and the longitudinal extent of which spans the opening width. In this way, it is insured that the fastening element would not slide out of the opening. Simultaneously, the connection link, when engaging the free end of the opposite shoulder, serves as an optical indicator of the securable position of the fastening element. To release the fastening element, it is rotated in opposite direction until the connection link again engages the free end of the shoulder opposite to the shoulder engageable by the connection link in the securable position of the fastening element. In this case also, the connection link prevents overpivoting of the fastening element or the rail nut. In this position of the connection link, the longitudinal sides of the rail nut again extend parallel to the longitudinal extent of the rail opening, and the fastening element can be taken off the rail.

A space-saving embodiment of the fastening element is obtained when the connection link is so located that an axial projection one of its side edges forms essentially a rectilinear extension of a longitudinal side of the rail nut.

When the location of the connection link is so selected that the rail nut, which is located inside the rail, can pivot maximum by 45°, the provisional pre-fixing of the connection element can be achieved with the smallest possible costs. With an appropriate alignment of the rail clip with respect to the rail nut, additional optical control of the attachment of the fastening element to the rail can be obtained when, e.g., a rectangular or square rail clip during the insertion of the rail nut, extends diagonally relative to the longitudinal extent of the rail nut and, upon being pivoted by about 45°, into its securable position, has its sides extending parallel to the longitudinal extent of the opening.

Advantageously, the edge section, at which the distance between the rail clip and the rail nut is smaller than the thickness of the free ends of the rail shoulder, is located opposite to the connection link, and the distance between the rail clip and the rail nut at this edge section is smaller than the distance between the rail clip and the rail nut in the region of the connection link. This insures that only upon complete rotation of the fastening element, the connection link abuts the free end of the respective rail shoulder, defining the securable position of the fastening element. Light, unintended clamping in an intermediate position is thereby prevented.

According to an advantageous embodiment of the present invention, wedge-shaped protrusions are formed at least two opposite regions on a bottom of the rail clip which grip outer sides of the shoulders in a position of the rail nut in which the longitudinal sides of the rail nut pivoted relative to the longitudinal extent of the opening.

The protrusions grip the rail in the securable position of the fastening element and prevent deformation of the rail shoulders during the fixing of the fastening element as a result of the compulsory reduction of the distance between the rail clip and the rail nut. Simultaneously, the protrusions prevent a reverse rotation and an undesirable rotation and loosening of the pre-fixed fastening element during its precise positioning. The wedge-shaped configuration of the protrusion elements facilitates sliding of the protrusion over the facing each other free ends of the shoulders and prevents locking of the protrusion when the fastening element is rotated into its securable position.

Surfaces of the rail nut which are operationally associated with the facing each other, free ends of the shoulders are provided with toothing, knurling or a similar structure. The toothing, knurling or similar structure form-lockingly engages a correspondingly formed structure of the free ends. This increases the retaining capability of the fastening element in the longitudinal direction of the rail.

The rail clip and the rail nut have respective bores which axially overlap each other. The bores serve for receiving a threaded rod or a tightening bolt or the like. With the aid of the threaded rod or the tightening bolt, inserted into the bores, the distance between the rail clip and the rail nut can be easily adjusted. Simultaneously, the threaded rod or the tightening bolt can serve as an attachment element for a constructional part, wall clamp and the like.

According to a particular embodiment of the present invention, two or more fastening elements form and angular assembly. To this end, two fastening elements are connected with each other at sides of their rail clips, which are opposite to their respective connection links, at an angle to each other. The angular assembly has an advantage that it can be inserted into a rail not only sidewise but also from the front, through the longitudinally extending opening. This increases the range of application of the inventive fastening element for different rail systems. In accordance with an advantageous embodiment of the angular assembly, the connection of the fastening elements is so effected that the inclination angle of two connected with each other fastening elements can be changed with application of relatively little efforts. This further increases the applicability range of the angular assembly.

According to a further advantageous embodiment of the angular assembly, at least one connection region of the connection links with the rail clip is formed as a break-off point, at which the rail nut can be separated from the rail clip. Because at least one rail nut can be removed, the angular assembly can be used both for connecting rails with each other and for mounting a rail on a wall. Thus, the angular assembly is suitable for effecting different types of fastening.

BRIEF DESCRIPTION OF THE DRAWINGS

The features and objects of the present invention will become more apparent, and the invention itself will be best understood from the following detailed description of the preferred embodiments when read with reference to the accompanying drawings, wherein:

FIG. 4 shows a top view of the fastening element inserted into the rail opening in its non-secured position;

FIG. 5 shows the same view as FIG. 4 but with the fastening element in its position in which it is ready to be secured.

DETAILED DESCRIPTION OF THE PREFERRED EMBODIMENT

Figure 1:
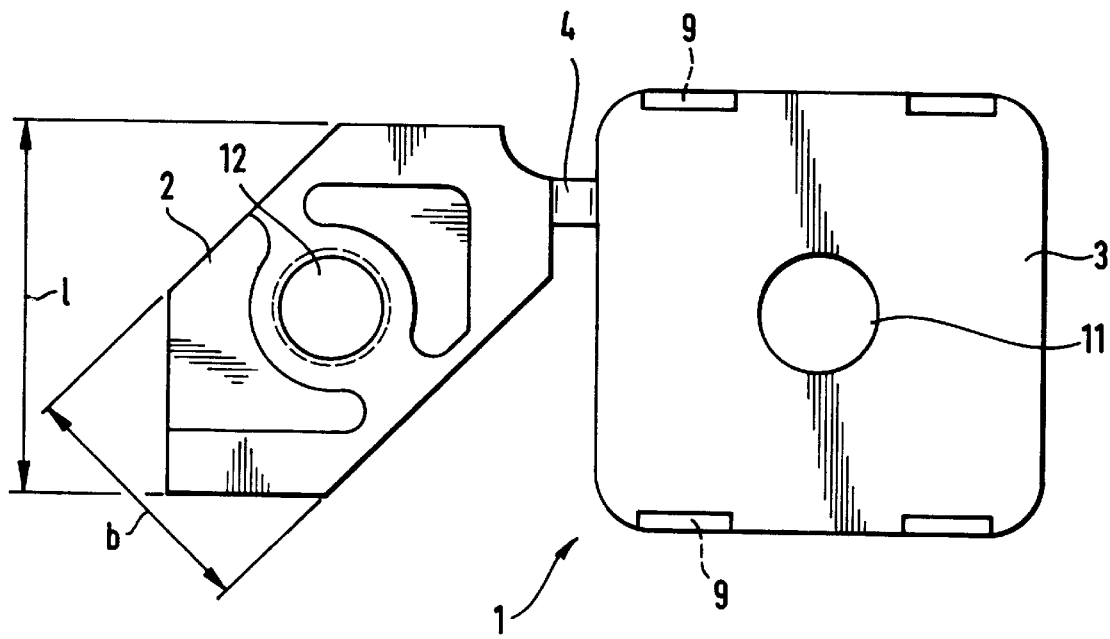
FIG. 1 shows a bottom view of a fastening element according to the present invention in an unfolded condition.
Figure 2:
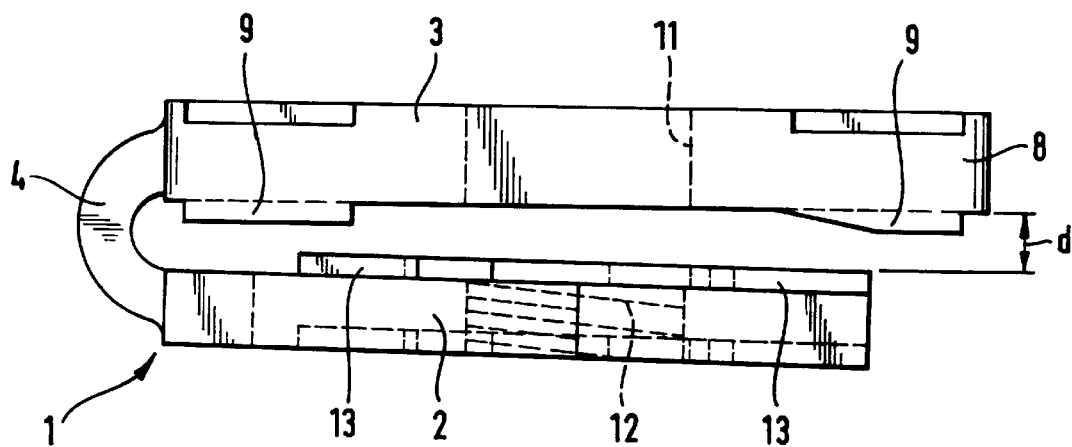
FIG. 2 shows a side elevational view of the fastening element shown in FIG. 1 in its bent use condition.

A fastening element according to the present invention, which is shown in FIGS. 1 and 2, is generally designated with a reference numeral 1. FIG. 1 shows the fastening element 1 in its unfolded condition and which has to be bent into its use condition shown in FIG. 2. The fastening element 1 can, e.g., be punched out of a sheet metal having an appropriate thickness. The sheet metal thickness can be in a range from about 3 mm to about 5 mm. The geometry of the blank for the inventive fastening element 1 is to selected that the blank or the stamping can be produced with minimum waste. For producing the blanks, a follow-on composite tool can be used.

The fastening element 1 includes a rail nut 2 which in the embodiment shown in the drawings, has a shape of a modified parallelogram. The height b of the parallelogram is smaller than the distance between the short sides of the parallelogram or the rail nut 2 which defines the length l of the parallelogram or the rail nut 2. A substantially rectangular or square rail clip 3 is integrally connected with the rail nut 2 by a resilient connection link 4. The rail nut 2 and the rail clip 3 have respective bores 12 and 11 which serve as a load application point and receive a threaded rod, tightening screw or the like. To this end, the bore 11 of the rail clip 3 is formed as a through-bore while the bore 12 of the rail nut 2 is provided with an inner thread.

In FIG. 2, the fastening element 1 is shown in its bent-over use condition. The rail clip 3 overlaps the rail nut 2, at least in some areas or in the embodiment shown in the drawings, allover. The rail nut 2 and the rail clip 3 are spaced from each other, in their overlapping condition, by a distance d which is smaller at the edge section remote from the connection link 4 than in the region adjoining the connection link 4. The bores 11 and 12 of the rail clip 3 and the rail nut 2 lie exactly one above the other. In this way, by screwing-in a threaded rod or a tightening bolt into the bore 12 of the rail nut 2, which is provided with an inner thread, with an abutment engaging an outer surface of the rail clip 3, the distance of between the rail clip 3 and the rail nut 2 can be further reduced.

Figure 3:
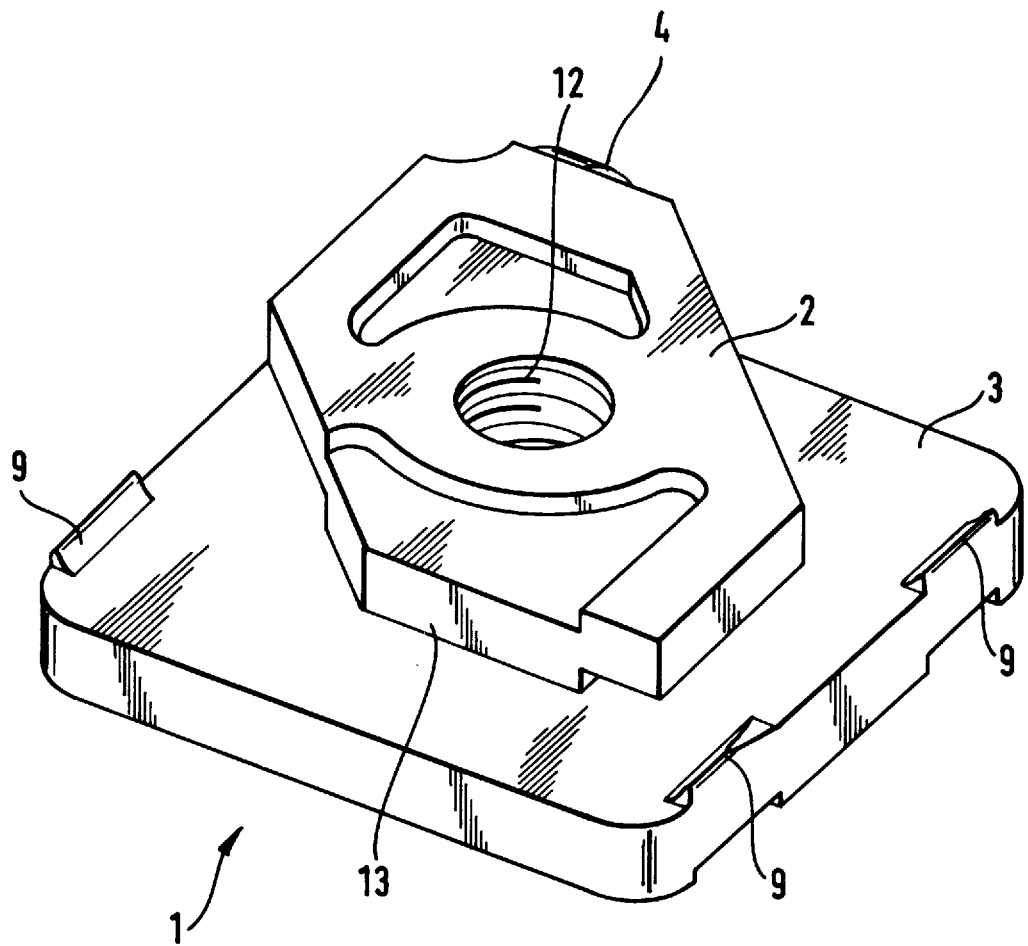
FIG. 3 shows a perspective view of the fastening element shown in FIG. 1 together with the rail nut.

The rail nut 2 is provided, as shown in FIGS. 2 and 3, with elevations 13 which function as a stop during tightening. This increases, during tightening, the necessary torque, so that the user can control the tightening process during the final stage of fastening the fastening element 1. As shown in FIGS. 1–3, wedge-shaped protrusions 9 are provided on the bottom of the rail clip 3 at its outer edge. The function of the protrusions 9 will be discussed further below. As shown in FIGS. 1–3, the rail nut 2 extends at an angle relative to the rail clip 3, preferably at an angle of 45°.

In FIGS. 4 and 5, the fastening element 1 is shown together with a section of a C-shaped rail 30. In FIG. 4, the connection element 1 is shown in its non-secured position, and in FIG. 5 the fastening element 1 is shown in the position in which it is ready to be secured. The rail 30 has substantially C-shaped cross-section and has a longitudinal slot-shaped opening 35 the width w of which is measured between facing each other free ends 33 and 34 of two, extending parallel to each other, shoulders 31, 32. In FIG. 4, the fastening element 1 together with the rail nut 2 is arranged in the opening 35. In FIG. 4, the height b of the rail nut 2, which is shown with dash lines, is smaller then the width w of the opening 35. In this way, the rail nut 2 can be inserted in the opening 35 when the longitudinal sides 6 and 7 of the rail nut 2 extend parallel to the longitudinal extent of the opening 35. According to FIG. 4, the connection link 4 is so arranged with respect to the rail nut 2 that it engages the free end 33 of the shoulder 31 when the longitudinal sides 6 and 7 of the rail nut 2 extend parallel to the longitudinal extent of the opening 35. Preferably, the engaging edge 5 of the connection link 4 is located on the axial projection of the extension of the longitudinal side 6 of the rail nut 2.

FIG. 5 shows the fastening element 1 in a position in which it is ready to be secured to the rail 30. To this end, the fastening element 1 is pivoted by an angle a so that the longitudinal sides of the rail nut 2 extend at an angle to the longitudinal extent of the opening 35. In the embodiment shown in FIG. 4, the angle α, by which the fastening element 1 is pivoted, is about 45°. The connection link 4 is so arranged that it limits the pivoting angle, abutting the free end 34 of the opposite shoulder 32. The edge section 8 of the fastening element 1, at which the distance d between the rail nut 2 and the rail clip 3 is the smallest, grips the free end 33 of the shoulder 31 and clamps it because the distance d is smaller then the thickness of the free ends 33, 34. In this position, the fastening element is ready to be secured to the rail 30. The protrusions 9, which are provided on the bottom of the rail clip 3 overlap the outer sides of the shoulders 31, 32 and prevent deformation of the rail sides. The surface sections 10 of the rail nut 2, which overlie the free ends 33, 34 of the shoulders 31, 32 can be provided, as shown in the drawings, with toothing, knurling or the like structure, which form-lockingly engages a correspondingly formed structure on the free ends 33, 34.

Figure 6:
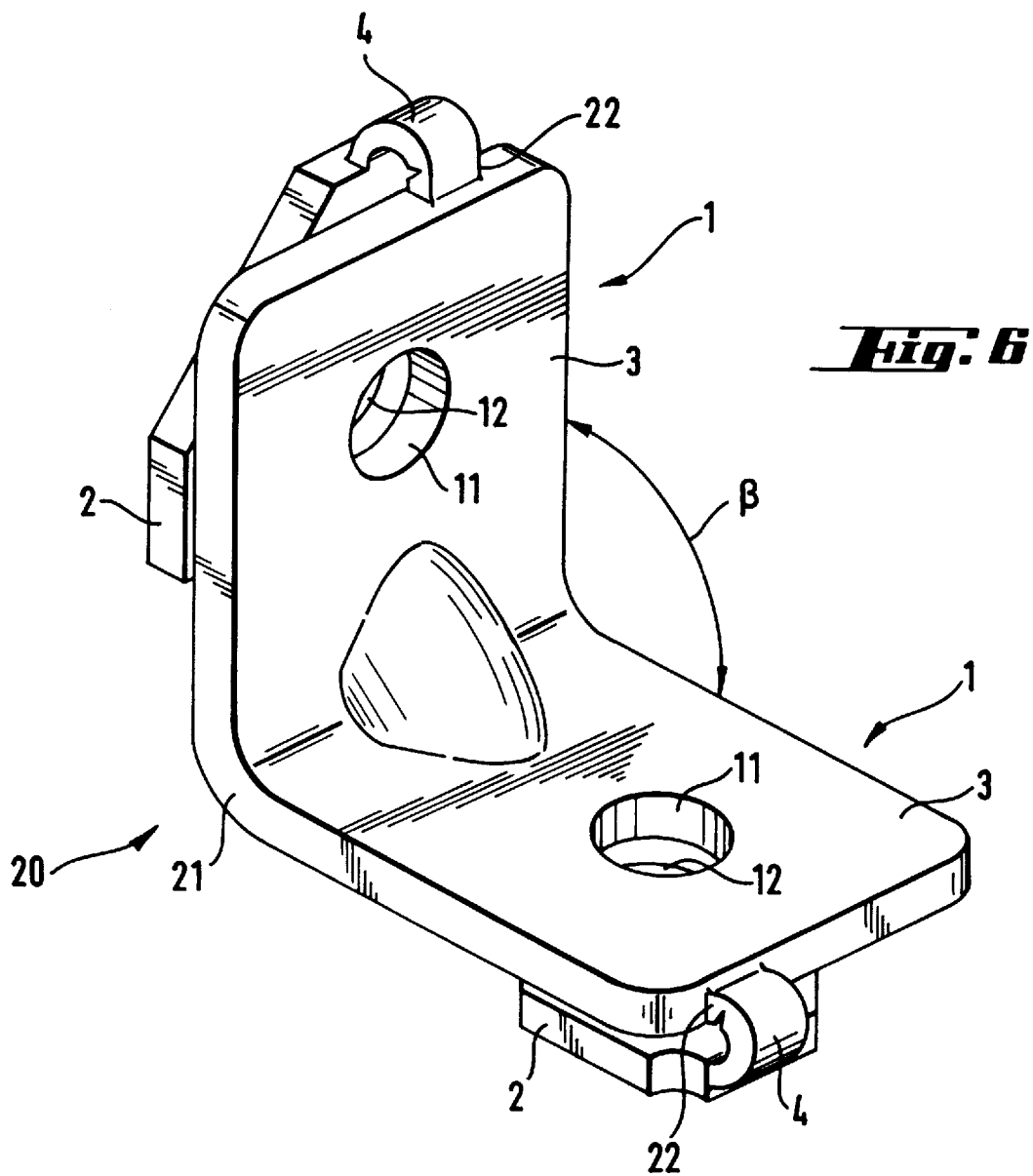
FIG. 6 shows a perspective view of two fastening elements connected with each other at an angle to each other.

FIG. 6 shows an angular assembly 20 formed of two fastening elements 1 according to the present invention. Each of the fastening elements 1 is formed of a rail nut 2 and a rail clip 3 connected with a connection link 4. The fastening elements are connected with each other at their sides 21 located opposite the respective connection links 4. Advantageously, the connection region is so formed that the angle β between the two connection elements is adjustable. At least one of the connection regions 22 of the two connection links 4, which are adjacent to the rail clips 3, is formed as a break-off point. In this way, at least one rail nut 2 of one of the fastening elements 1, which from the angular assembly 20, can be separated from the one fastening element 1. A so modified angular assembly 20 can then be mounted on a wall. This increases the field in which the angular assembly 20 can be used. Generally, more than two fastening elements 1 can be connected with each other, with the connection regions of the fastening elements being advantageously so formed that the user can change the angle formed by two fastening elements with a relatively small expenditure of force.

The fastening element according to the present invention was discussed with reference to a concrete embodiment example. The specific projections, angle ratios, and shapes of the rail clip and the rail nut should be seen only as exemplary. This is particularly applicable to the shape of the parallelogram-shaped rail nut, the height and length of which are dimentioned and, if needed, modified so that it can be inserted through the rail opening inside the rail and can be pivoted to the extent that the longitudinal extent of the nut overlaps the opening width. The rail clip is shown as being square. It should be understood that it can be formed as a polygon or can be made circular. With respect to the outer contour, the only thing which is necessary is that it overlaps the rail opening. As a material for the fastening element, a sheet metal having a predetermined thickness can be used. However, the fastening element can be formed of other type of sheets and of plastic the thickness of which depends on the desired resiliency characteristics and the required retaining values.

Though the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A fastening element for a shaped rail (30) having a substantially C-shaped cross-section and a slot-shaped opening (35) extending in longitudinal direction of the rail and having a width (w) which equals a distance between facing each other free ends (33, 34) of spaced, extending parallel to each, rail shoulders (31, 32), the fastening element (1) comprising a rail nut (2) insertable through the rail opening (35) into an interior of the rail (30) when longitudinal sides (6, 7) of the rail nut (2) extend parallel to the longitudinal direction of the rail (30) and pivotable in the interior of the rail (30) so that a longitudinal extent (l) of the rail nut (2), which is larger than the width (w) of the slot-like opening (35), would overlap the opening (35); a rail clip (3) overlapping the rail nut (2) at least in some areas and spaced therefrom in an axial direction by a distance (d), with the distance (d) between the rail nut (2) and the rail clip (3) at least in an edge section (8) which is brought in an operational connection with the free end (33) of the shoulder (31), is smaller than a thickness of the free ends of the shoulders (31, 32), with the distance (d) being reduced upon clamping the free ends (33, 34) of the shoulders (31, 32) the rail clip (3) being formed as one-piece with the rail nut (2); and a resilient connection link (4) connecting the rail clip (3) with the rail nut (2), the connection link (4) being so attached to an edge of the rail nut (2) that with the longitudinal sides (6, 7) of the rail nut (2) extending parallel to the longitudinal extent of the opening (35), it would engage the free end (33) of one shoulder (31) and, with the longitudinal sides (6, 7) of the rail nut (2) being pivoted with respect to the longitudinal extent of the opening (35), it would engage the free end (34) of an opposite shoulder (32).

2. A fastening element according to claim 1, wherein the connection link (4) has a side edge (5) an axial projection of which forms substantially a rectilinear extension of a longitudinal side (6) of the rail nut (2).

3. A fastening element according to claim 1, wherein the connection link (4) is so arranged that the rail nut (2), when located in the interior of the rail (30), is rotatable by an angle (α) of about 45°.

4. A fastening element according to claim 1, wherein the distance (d) between the rail nut (2) and the rail clip (3) in the edge section (8) is smaller than the distance between the rail nut (2) and the rail clip (3) in the region of the connection link (4).

5. A fastening element according to claim 1, wherein edge-shaped protrusions (9) are formed at at least two opposite regions on a bottom of the rail clip (3), the protrusions gripping outer sides of the shoulders (31, 32) in a position of the rail nut (2) in which the longitudinal sides (6, 7) of the rail nut (2) are pivoted relative to the longitudinal extent of the opening (35).

6. A fastening element according to claim 1, wherein surfaces (10) of the rail nut (2), which are operationally associated with the facing each other free ends (33, 34) of the shoulders (31, 32) are provided with one of toothing, knurling and a similar structure for engaging a correspondingly formed structure of the free ends (33, 34).

7. A fastening element according to claim 1, wherein the rail clip (3) and the rail nut (2) have respective bores (11, 12) which axially overlap each other, for receiving one of a threaded rod, a lightening bolt and a similar member.

8. An angular assembly, comprising at least two fastening elements for a shaped rail (30) having a substantially C-shaped cross-section and a slot-shaped opening (35) extending in a longitudinal direction of the rail and having a width (w) which equals a distance between facing each other free ends (33, 34) of spaced, extending parallel to each other, rail shoulders (31, 32), each fastening element (1) comprising a rail nut (2) insertable through the rail opening (35) into an interior of the rail (30) when longitudinal sides (6, 7) of the rail nut (2) extend parallel to the longitudinal direction of the rail (30) and pivotable in the interior of the rail (3) so that a longitudinal extent (1) of the rail nut (2), which is larger than the width (w) of the slot-like opening (35), would overlap the opening (35); a rail clip overlapping the rail nut (2) at least in some areas and spaced therefrom in an axial direction by a distance (d), with the distance (d) between the rail nut (2) and the rail clip (3) at least in an edge section (8) which is brought in an operational connection with the free end (33) of the shoulder (31), is smaller than a thickness of the free ends of the shoulders (31, 32), with the distance (d) being reduced upon clamping the free ends (33, 34) of the shoulders (31, 32), the rail clip (3) being formed as one-piece with the rail nut (2); and a resilient connection link (4) connecting the rail clip (3) with the rail nut (2), the connection link (4) being so attached to an edge of the rail nut (2) that with the longitudinal sides (6, 7) of the rail nut (2) extending parallel to the longitudinal extent of the opening (35), it would engage the free end (33) of one shoulder (31) and, with the longitudinal sides (6, 7) of the rail nut (2) being pivoted with respect to the longitudinal extent of the opening (35), it would engage the free end (34) of the opposite shoulder (32); the two fastening elements being connected at sides (21) of the rail clips (3) opposite to respective connection links (4) and forming an angle with each other.

9. An angular assembly according to claim 8, wherein the connection region (21) of the at least two fastening elements (1) is so formed that the inclination angle (β) is adjustable.

10. An angular assembly according to claim 8, wherein at least one of adjoining regions of the connection links (4) with the rail clips (3) is formed as a break-off point which provides for separation of the rail nut (2) from an associated rail clip (3).

* * * * *